US010534955B2

(12) United States Patent
Francisco et al.

(10) Patent No.: US 10,534,955 B2
(45) Date of Patent: Jan. 14, 2020

(54) FACIAL CAPTURE ANALYSIS AND TRAINING SYSTEM

(71) Applicant: DreamWorks Animation LLC, Glendale, CA (US)

(72) Inventors: Emmanuel C. Francisco, Pasadena, CA (US); Demian Gordon, Culver City, CA (US); Elvin Korkuti, Pasadena, CA (US)

(73) Assignee: DreamWorks Animation L.L.C., Universal City, CA (US)

( * ) Notice: Subject to any disclaimer, the term of this patent is extended or adjusted under 35 U.S.C. 154(b) by 369 days.

(21) Appl. No.: 15/408,308

(22) Filed: Jan. 17, 2017

(65) Prior Publication Data

US 2017/0213076 A1 Jul. 27, 2017

Related U.S. Application Data

(60) Provisional application No. 62/286,219, filed on Jan. 22, 2016.

(51) Int. Cl.
*G06K 9/00* (2006.01)

(52) U.S. Cl.
CPC ..... *G06K 9/00302* (2013.01); *G06K 9/00228* (2013.01); *G06K 9/00268* (2013.01)

(58) Field of Classification Search
CPC .......... G06K 9/00302; G06K 9/00228; G06K 9/00268

See application file for complete search history.

(56) References Cited

U.S. PATENT DOCUMENTS

| 4,769,845 | A | * | 9/1988 | Nakamura | ......... G06K 9/00268 382/100 |
| 5,003,601 | A | * | 3/1991 | Watari | ..................... G10L 15/00 704/234 |
| 5,477,451 | A | * | 12/1995 | Brown | ................. G06F 17/2755 704/2 |
| 6,345,109 | B1 | * | 2/2002 | Souma | ............... G06K 9/00268 382/118 |

(Continued)

FOREIGN PATENT DOCUMENTS

WO  WO9854696  * 12/1998

OTHER PUBLICATIONS

Somasundaram, Arunachalam, and Rick Parent. A facial animation system for expressive audio-visual speech. OSU-CISRC-4/06-TR46. Columbus, OH: Department of Computer Science and Engineering, The Ohio State University, 2006. 34 pages (Year: 2006).*

(Continued)

*Primary Examiner* — Manav Seth
(74) *Attorney, Agent, or Firm* — Dentons US LLP

(57) ABSTRACT

A method for evaluating a facial performance using facial capture of two users includes obtaining a reference set of facial performance data representing a first user's facial capture; obtaining a facial capture of a second user; extracting a second set of facial performance data based on the second user's facial capture; calculating at least one matching metric based on a comparison of the reference set of facial performance data to the second set of facial performance data; and displaying an indication of the at least one matching metric on a display.

43 Claims, 16 Drawing Sheets

(56) References Cited

U.S. PATENT DOCUMENTS

| | | | | |
|---|---|---|---|---|
| 6,580,811 B2* | 6/2003 | Maurer | G06K 9/00228 | 348/169 |
| 6,594,629 B1* | 7/2003 | Basu | G06K 9/00228 | 704/233 |
| 6,816,836 B2* | 11/2004 | Basu | G06K 9/00228 | 382/100 |
| 6,828,972 B2* | 12/2004 | Zhang | G06K 9/00268 | 345/473 |
| 6,940,454 B2* | 9/2005 | Paetzold | G06K 9/00228 | 345/473 |
| 7,636,662 B2* | 12/2009 | Dimtrova | G06K 9/00268 | 345/473 |
| 8,213,509 B2* | 7/2012 | Kapasi | H04N 19/56 | 375/240.16 |
| 8,295,614 B2* | 10/2012 | Ishiyama | G06K 9/00268 | 382/154 |
| 8,396,708 B2* | 3/2013 | Park | G10L 17/26 | 704/231 |
| 8,406,485 B2* | 3/2013 | Ogawa | H04N 5/232 | 382/118 |
| 8,416,996 B2* | 4/2013 | Ogawa | H04N 5/232 | 382/118 |
| 8,879,854 B2* | 11/2014 | Velusamy | G06K 9/00315 | 382/224 |
| 8,929,611 B2* | 1/2015 | Tanaka | G06K 9/00288 | 382/115 |
| 9,008,416 B2* | 4/2015 | Movellan | G06K 9/00302 | 382/159 |
| 9,076,028 B2* | 7/2015 | Summers | H04N 7/15 | |
| 9,111,134 B1* | 8/2015 | Rogers | G06K 9/00302 | |
| 9,134,816 B2* | 9/2015 | Dahlkvist | G06F 3/033 | |
| 9,171,199 B2* | 10/2015 | Sakai | H04N 7/141 | |
| 9,256,953 B2* | 2/2016 | Murakami | G06T 7/20 | |
| 9,420,169 B2* | 8/2016 | Uemura | H04N 5/265 | |
| 9,443,167 B2* | 9/2016 | Movellan | G06K 9/00302 | |
| 9,449,218 B2* | 9/2016 | Smith | G06K 9/00302 | |
| 9,449,521 B2* | 9/2016 | Dahlkvist | G06F 16/31 | |
| 9,472,186 B1* | 10/2016 | Clark | G10L 15/063 | |
| 9,503,632 B2* | 11/2016 | Lee | G06K 9/00308 | |
| 9,600,715 B2* | 3/2017 | Natan | G06K 9/00281 | |
| 9,639,737 B2* | 5/2017 | Beeler | G06K 9/00214 | |
| 9,674,488 B2* | 6/2017 | Sakai | H04N 7/141 | |
| 9,681,166 B2* | 6/2017 | Naveh | G06F 16/5866 | |
| 9,760,766 B2* | 9/2017 | Gil | G06K 9/00892 | |
| 9,779,289 B2* | 10/2017 | Movellan | G06K 9/00302 | |
| 10,225,608 B2* | 3/2019 | Shigeta | H04N 21/4223 | |
| 2013/0271361 A1* | 10/2013 | Velusamy | G06F 3/011 | 345/156 |
| 2015/0127343 A1* | 5/2015 | Mullor | G10L 17/26 | 704/244 |
| 2015/0304549 A1* | 10/2015 | Lee | G06K 9/00308 | 348/211.4 |
| 2017/0061202 A1* | 3/2017 | Shreve | G06K 9/00315 | |
| 2018/0314812 A1* | 11/2018 | Qin | G06K 9/00 | |

OTHER PUBLICATIONS

Cao, Chen, et al. "3D shape regression for real-time facial animation." ACM Transactions on Graphics (TOG) 32.4 (2013): 41. 12 pages (Year: 2013).*

Extended European Search Report includes (European search report and European search opinion) received for European Patent Application No. 17152563.7, dated Jun. 7, 2017, 6 pages.

Kaur et al., "User Authentication in Social Networking Sites using Face Recognition", 2nd IEEE International Conference on Parallel Distributed and Grid Computing, 2012, pp. 773-778.

Mahoor et al., "Facial Action Unit Recognition with Sparse Representation", Department of Electrical and Computer Engineering, 2011, pp. 336-342.

Mliki et al., "Face Recognition Through Different Facial Expressions", Journal of Signal Processing Systems, vol. 81, 2015, pp. 433-446.

* cited by examiner

| Shapes | |
|---|---|
| 1 | Eye Blink |
| 2 | Eye Squint |
| 3 | Eye Down |
| ... | |
| 20 | Sneer |
| 21 | Mouth Smile |
| ... | |
| Shape N | Jaw Open |

FIG. 5

| Viseme | Set | VShape |
|---|---|---|
| 1 | Neutral | Neutral |
| 2 | Musical Set | Do |
| 3 | | Re |
| ... | | |
| 20 | Phonetic | AH |
| 21 | | UH |
| ... | | |
| VizN | | SH |

FACIAL CAPTURE ANALYSIS AND TRAINING SYSTEM

CROSS-REFERENCE TO RELATED APPLICATIONS

This application claims the benefit under 35 U.S.C. § 119(e) of U.S. Provisional Patent Application No. 62/286,219, titled "Facial Capture Analysis and Training System," filed Jan. 22, 2016, the content of which is incorporated herein by reference in its entirety for all purposes.

BACKGROUND

1. Field

This application relates generally to a facial capture analysis and training system, and more specifically to evaluating a facial performance using facial capture.

2. Description of the Related Art

Facial capture refers to the process of capturing a digital representation of a person's face using, for example, a video camera, laser scanner, or sensors. The resulting digital representation can then be analyzed to identify and track facial landmarks (such as the location of the lips and eyes) and determine facial movements or expressions, for example. Facial capture is sometimes used for generating CGI avatars for movies or games.

In some cases, it may be useful to compare a user's facial performance to a reference facial performance, such as when one person is attempting to reproduce the facial movements of another person. There is a need for systems and methods that use facial capture to compare the facial performance of a user to a reference facial performance, analyze how well they match, and provide automated feedback on the match quality.

SUMMARY

In accordance with some embodiments, a method for evaluating a facial performance using facial capture of two users includes: obtaining a reference set of facial performance data representing a first user's facial capture; obtaining a facial capture of a second user; extracting a second set of facial performance data based on the second user's facial capture; calculating at least one matching metric based on a comparison of the reference set of facial performance data to the second set of facial performance data; and displaying an indication of the at least one matching metric on a display.

In accordance with some embodiments, a system for evaluating a facial performance using facial capture of two users includes: a display; a camera/scanner; one or more processors; a memory; one or more programs, wherein the one or more programs are stored in the memory and configured to be executed by the one or more processors, the one or more programs including instructions for: obtaining a reference set of facial performance data representing a first facial capture of a first user's performance; obtaining, from the camera/scanner, a second facial capture of a second user's performance; extracting a second set of facial performance data based on the second facial capture; calculating at least one matching metric based on a comparison of the reference set of facial performance data to the second set of facial performance data; and enabling display, on the display, of an indication of the at least one matching metric.

In accordance with some embodiments, a non-transitory computer-readable storage medium storing one or more programs, the one or more programs comprising instructions, which when executed by a processor in a system with a camera/scanner and a display cause the processor to: obtain a reference set of facial performance data representing a first facial capture of a first user's performance; obtain, from the camera/scanner, a second facial capture of the second user's performance; extract a second set of facial performance data based on the second facial capture; calculate at least one matching metric based on a comparison of the reference set of facial performance data to the second set of facial performance data; and enable display, on the display, of an indication of the at least one matching metric.

DESCRIPTION OF THE FIGURES

FIG. 5 depicts an exemplary set of face shapes that may be used for face shape analysis.

FIG. 10 depicts exemplary sets of visemes.

The embodiments depicted in the figures are only exemplary. One skilled in the art will readily recognize from the following discussion that alternative embodiments of the systems and methods illustrated herein can be employed without departing from the principles described herein.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

As discussed above, facial capture can be used for a variety of purposes, including generation of CGI avatars. There is a need, however, for facial capture analysis and training systems that use facial capture to compare a user's facial performance to a reference facial performance and determine how well they match. Such a system may provide feedback to the user (or other people) on the quality of the match, thereby providing a training mechanism to help the the user improve their ability to match a reference facial performance.

There are multiple scenarios in which a user may want to accurately reproduce the facial movements of a reference facial performance. For example, a user may be learning a foreign language and may wish to emulate a native speaker's lip and tongue movements in order to produce certain sounds. A user may be suffering from a medical impairment that affects their ability to control their facial movements and may wish to emulate reference facial movements in order to re-train their facial muscles. A user may wish to accurately lip-synch to a reference vocal performance.

Thus, computer-enabled systems and methods that analyze how well a user is reproducing a reference facial performance and provide feedback on the quality of the match can be useful for a variety of purposes.

Reference Performance: Capture and Analysis

Figure 1:
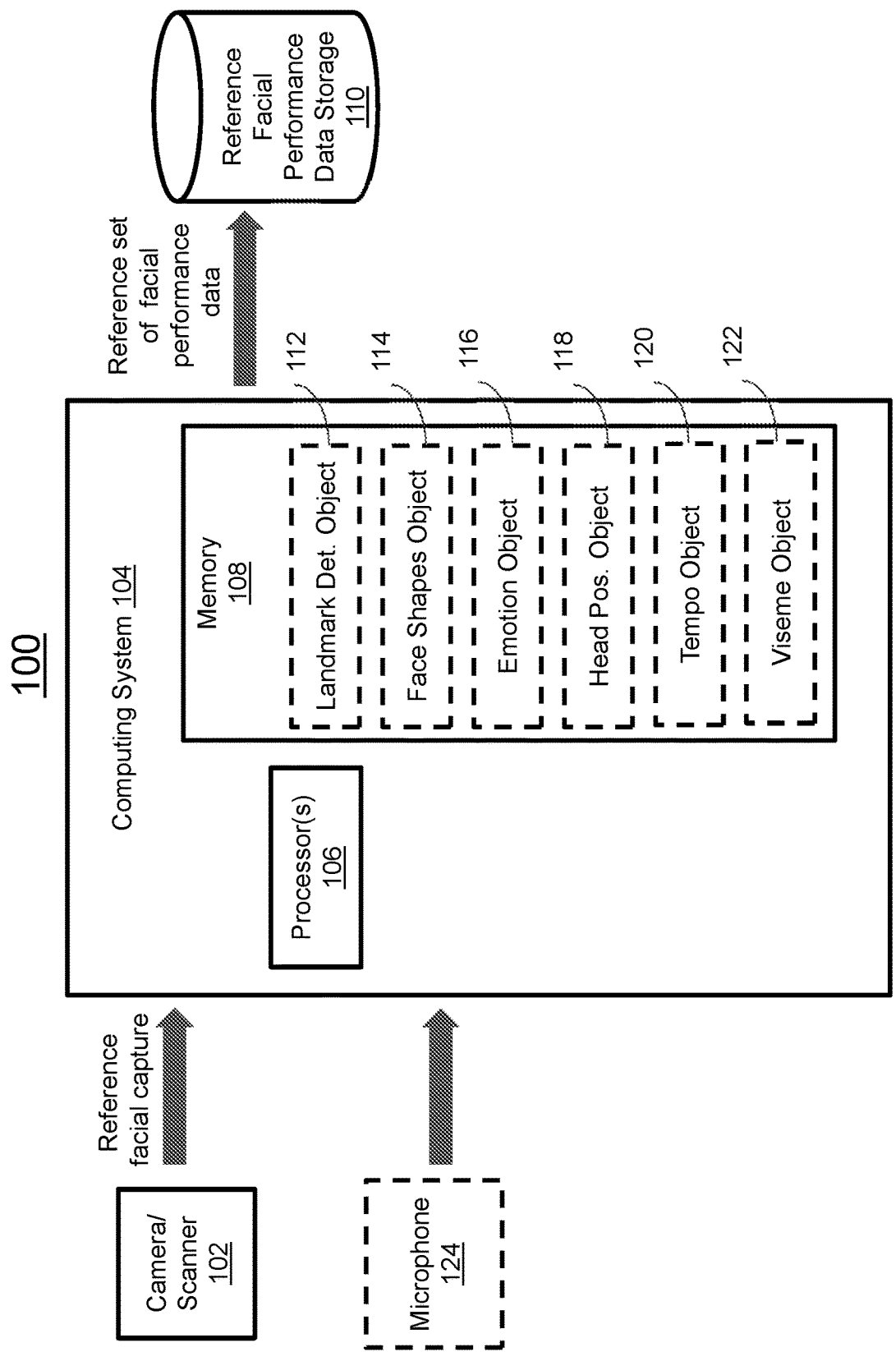
FIG. 1 depicts a block diagram of an exemplary facial capture analysis system that can be used to extract a reference set of facial performance data.

FIG. 1 depicts an exemplary facial capture and analysis system 100 that can be used to capture and analyze a reference facial performance—such as the face of a person speaking or singing—and generate a reference set of facial performance data. Facial capture and analysis system 100 can be implemented using camera/scanner 102 to obtain a reference facial capture and computing system 104 having one or more processor(s) 106 to execute facial analysis objects that reside in memory 108. These objects may include landmark detection object 112, face shapes object 114, emotion object 116, head position object 118, tempo object 120, and/or viseme object 122, each of which is described in more detail with respect to FIG. 2. Computing system 102 can use one or more of these facial analysis objects to analyze the reference facial capture and extract a reference set of facial performance data, which can then be stored in reference facial performance data storage 110.

Optionally, system 100 includes microphone 124 to obtain audio data associated with the reference performance, such as an audio recording of the reference performance.

While reference facial performance data storage 110 is shown as being a separate database that is separate from computing system 104, it should be appreciated that reference facial performance data storage 110 may instead be implemented using a single storage device that is local or remote to computing system 104.

As discussed in greater detail below, facial capture and analysis system 100 can be used to extract a reference set of facial performance data that can subsequently be used for comparison with a user's facial performance.

Figure 2:
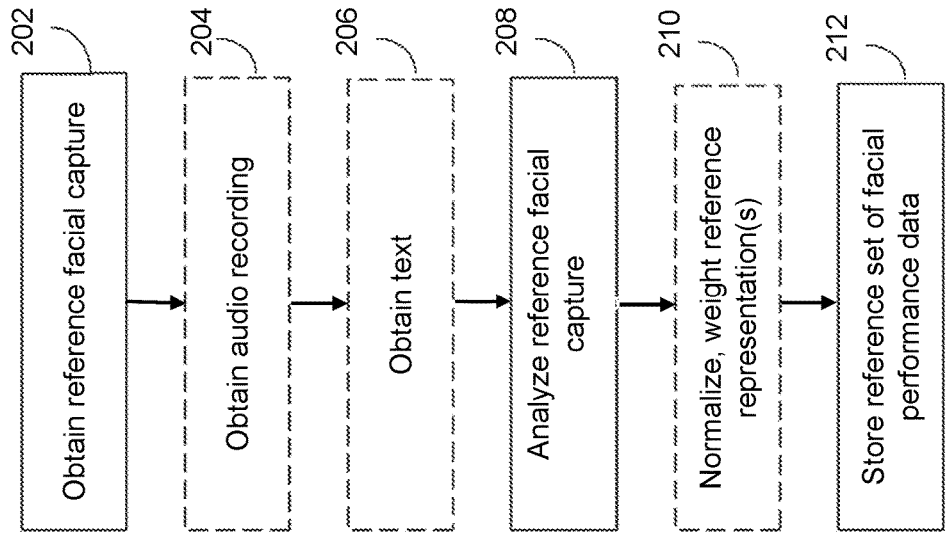
FIG. 2 illustrates an exemplary process 200 for analyzing a reference facial capture to extract a reference set of facial performance data.

FIG. 2 illustrates exemplary process 200 for analyzing a reference facial capture to extract a reference set of facial performance data.

At block 202, a reference facial capture of a first user's performance is obtained. In some embodiments, the reference facial capture is obtained using camera/scanner 102, as depicted in FIG. 1. In some embodiments, camera/scanner 102 includes a video camera, still image camera, and/or laser scanner. In some embodiments, the reference facial capture is a video recording of a reference facial performance obtained using a video camera. In some embodiments, the reference facial capture is a still image of the reference facial performance obtained using a still image camera. In some embodiments, the reference facial capture is a digital scan of the reference facial performance obtained using a laser scanner, mesh scanner, marker-based scanner, or markerless scanner.

In some embodiments, camera/scanner 102 includes facial sensors and/or facial electrodes, and the reference facial capture includes data from the sensors and/or electrodes.

A person of skill in the art will appreciate that there are many types of apparatus (and corresponding outputs) that can be used to obtain a facial capture.

Optionally, at block 204, an audio recording is obtained. In some embodiments, the audio recording is obtained using microphone 124 depicted in FIG. 1. In some embodiments, the audio recording is a recording of an audible portion of the reference performance obtained via a microphone, for example. In some embodiments, the audio recording is a recording of the reference performer singing a song or speaking a word, for example.

Optionally, at block 206, text is obtained. In some embodiments, the text is obtained from a keyboard or from computer storage media, for example. In some embodiments, the text is associated with the reference facial performance. For example, the text may be the lyrics to a song the reference performer is singing or a word the reference performer is speaking.

At block 208, the reference facial capture is analyzed. In some embodiments, the reference facial capture is analyzed using one or more of the objects 112, 114, 116, 118, 120, 122 depicted in memory 108 of FIG. 1, each of which is described in more detail below.

In some embodiments, the reference facial capture is analyzed using the landmark detection object. The landmark detection object extracts landmark data representing the locations of facial landmarks such as the locations of the eyes, lips, nose, etc. Such landmark data may subsequently be used as an input to identify facial expressions, facial movements, head motion, and/or head motion tempo as described with respect to the face shapes object, head motion object, and tempo object below, for example.

In some embodiments, the reference facial capture is analyzed using the face shapes object. The face shapes object extracts a shapes representation of the reference facial capture using face shapes analysis techniques, such as FACS (facial action coding system). Shapes analysis identifies predefined face shapes such as "mouth open," "lip pucker," "lip funnel," "eyebrows up," "cheek squint," etc. An exemplary set of face shapes is depicted in FIG. 5.

Conceptually, the face shapes object decomposes a facial expression into a combination of predefined face shapes, with each shape having a corresponding coefficient that captures how strongly the face shape is represented. The face shapes object is used to extract a shapes representation of the reference facial capture, which may take the form of the following equation:

$$fO(n)=s1*shape1(n)+s2*shape2(n) \ldots sN*shapeN(n);$$

where shapex(n) is a predefined facial shape (such as one of the face shapes listed in FIG. 5), sx is a coefficient, and N is the number of facial shapes being used to represent the facial expression.

Figure 6:
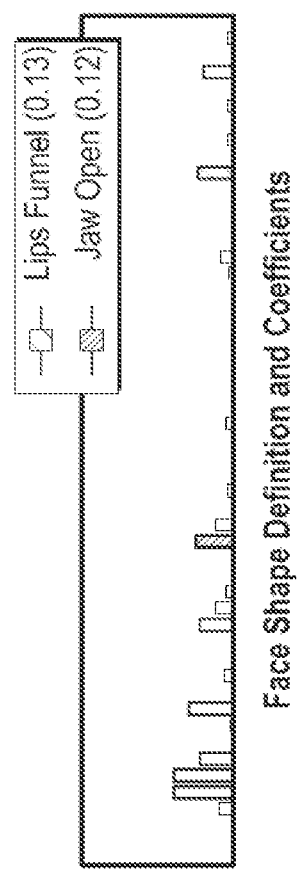
FIG. 6 depicts an exemplary set of face shapes and coefficients corresponding to a facial expression.
Figure 6:
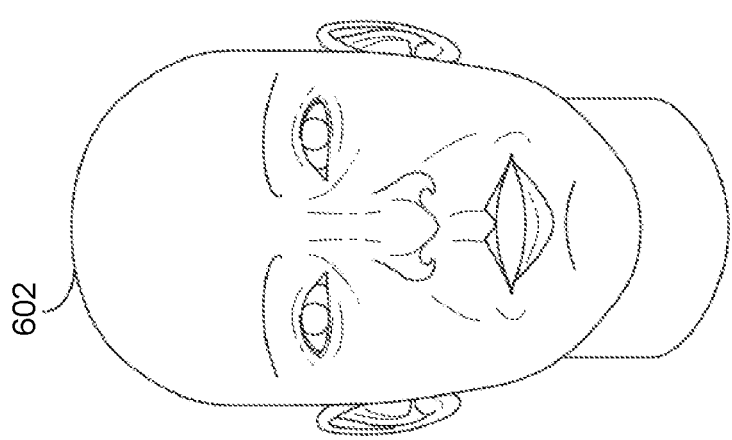

For example, FIG. 6 depicts the result of a face shape analysis of face 602 using a FACS algorithm, which yields coefficients of 0.13 and 0.12 for the face shapes "Lips Funnel" and "Jaw Open," respectively. In this example, the shapes representation of face 602 may be:

$$fO(n)=0.13*\text{Lips Funnel}+0.12*\text{Jaw Open}.$$

In some embodiments, the face shapes object uses face shapes analysis (e.g., FACS) to determine how a facial expression is changing over time; e.g., to identify facial movements.

Figure 7:
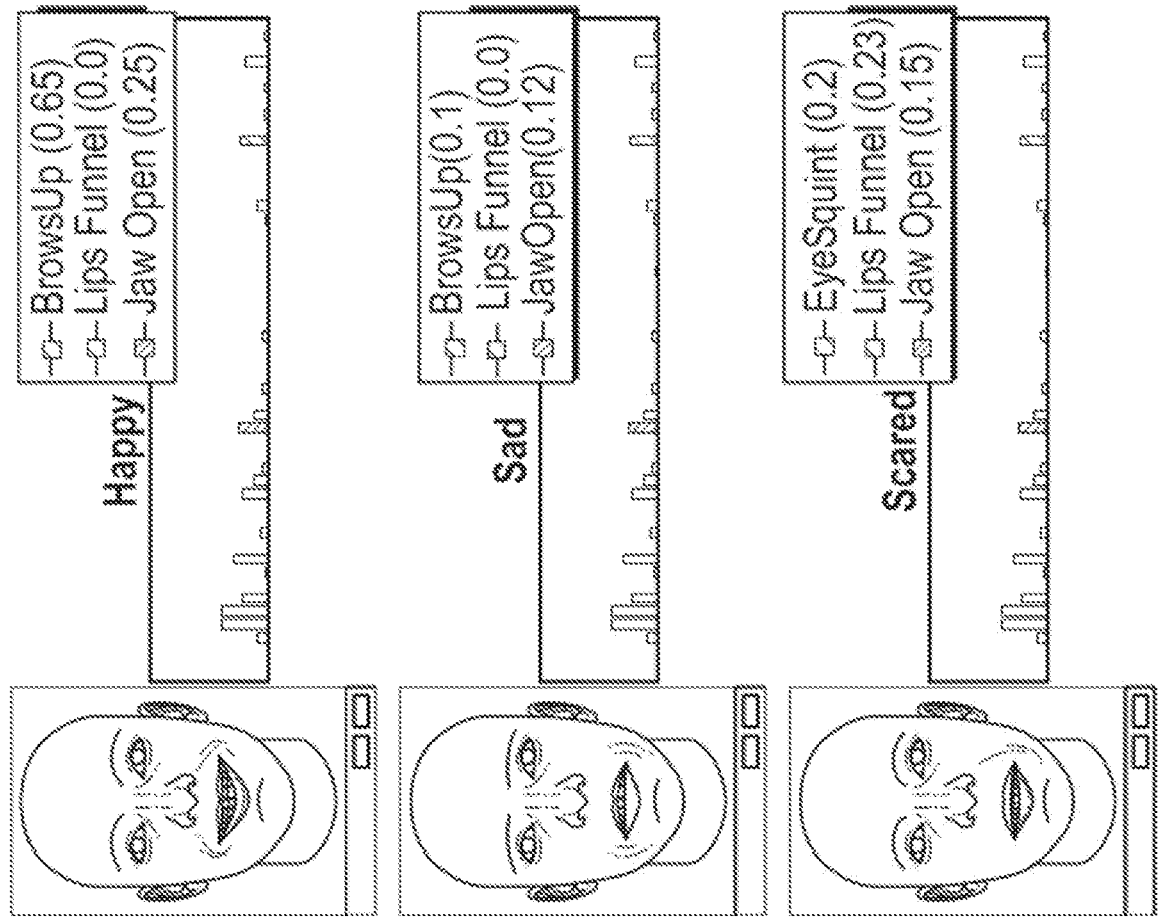
FIG. 7 depicts exemplary face shapes, coefficients, and emotions corresponding to facial expressions.

In some embodiments, the reference facial capture is analyzed using the emotion object. The emotion object extracts an emotion representation of the reference facial capture. In some embodiments, the emotion algorithm extracts the emotion representation based on the results of the face shapes object, by mapping face shapes to emotions. For example, as depicted in FIG. 7, the emotion "happy" may be represented by the following combination of weighted face shapes:

$$\text{Happy}(n)=0.65*\text{BrowsUp}+0.25*\text{JawOpen}$$

The emotion algorithm may map the face shapes representation extracted by the shapes object to emotions using predefined relationships between face shapes and emotions. In some embodiments, the emotion object can determine whether the face shapes in the shapes representation are mapped to more than one emotion; for example, the shapes representation may be associated with a combination of happiness and surprise. Thus, in some embodiments, the emotion object extracts an emotion representation of the reference facial capture in the form of the following equation:

$$E(n)=e1*\text{emotion1}(n)+e2*\text{emotion2}(n) \ldots eN*\text{emotion}N(n);$$

where emotionX is an emotion such as happy, sad, or scared, for example, such as depicted in FIG. 7. Here, ex is a coefficient and N is the number of emotions being used to represent the facial expression.

As shown above, in some embodiments, the emotion representation includes coefficients ex for each constituent emotion that are based on their how strongly the emotion is represented. For example, in the emotion representation:

$$E(n)=0.3*\text{Happy}(n)+0.0*\text{Sad}(n)+0.1*\text{Surprised}(n)$$

the emotion algorithm has determined that, based on the output from the face shapes object, the performer's expression is moderately correlated with being happy (e.g., the shapes representation is moderately well correlated to predefined "happy" face shapes, such as the equation for Happy(n) depicted above), slightly correlated with "surprised" face shapes, and not correlated at all with "sad" face shapes.

In some embodiments, the emotion object can be configured to compensate for differences in how different people facially express emotions, by creating user-specific mappings between face shapes and emotions. For example, some people's "happy" expression may have more "cheeks raised" and less "jaw open" than other people's "happy" expression. Some people may have a "happy" expression that includes a different set of facial shapes entirely. Such differences may make it difficult to extract an emotion representation of a facial capture. To address this challenge, in some examples, the emotion algorithm can be configured to define a specific user's face shape representation as representing a particular emotion, such as "happy." For example, system 100 can capture a specific user's "happy" facial expression (e.g., from a video or still image of the user), decompose the expression using, e.g., FACS shape analysis, and identify the resulting combination of facial shapes as a predefined "happy" expression. This mapping can then be used by the emotion object to extract the emotion representation.

In some embodiments, the emotion object can extract an emotion representation based on an analysis of facial landmark information (such as the facial landmark data extracted by the landmark detection object), facial meshes, or other data included in the reference facial capture.

In some embodiments, the reference facial capture is analyzed using the head position object. The head position object extracts a head position representation of the reference facial capture. In some embodiments, the head position object determines the head position and head rotation of the reference performer based on facial landmark data (such as the facial landmark data extracted by the landmark detection object). The head position object extracts a head position representation of the reference facial capture such as the following:

$$hO(n)=xO(n)+yO(n)+zO(n)+rxO(n)+ryO(n)+rzO(n);$$

where x, y, z capture translational head position information and rx, ry, rz capture the rotational head position information. In some embodiments, the head position object analyzes the reference facial capture to determine how the head position of the performer changes over time; e.g., to identify head motion.

Figure 8:
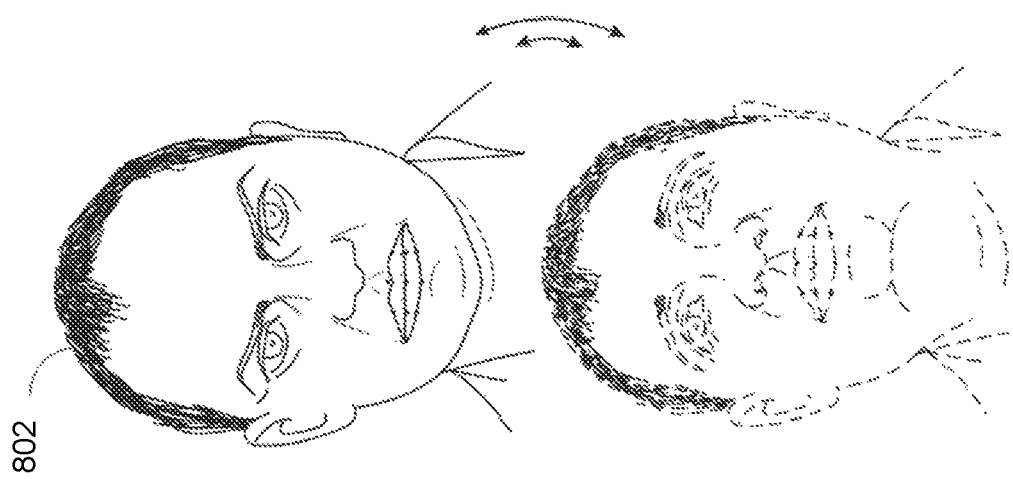
FIG. 8 depicts exemplary head motion tracking based on facial landmarks.
Figure 8:
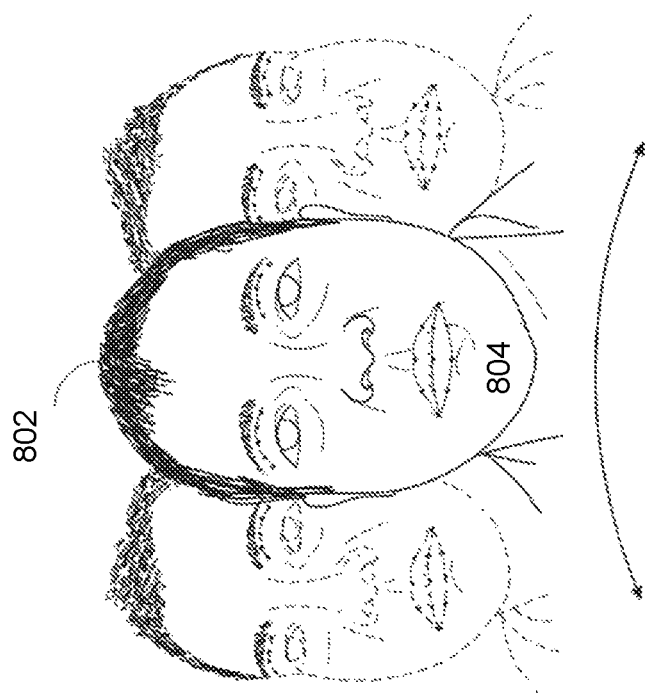

In some embodiments, the head position object determines head motion by tracking the movements of facial landmarks, based on extracted facial landmark data. As depicted in FIG. 8, the head position object can track the movement of facial landmark data that represents the location of the lips, brows, and eyes of performer 802, as indicated by points 804 along the lips, brows, and eyes. By tracking the movements of the facial landmarks, the head position object can determine whether the reference performer is moving their head in a lateral or vertical arc, for example.

In some embodiments, the reference facial capture is analyzed using the tempo object. The tempo object extracts a tempo representation of the reference facial capture. The tempo object can determine the tempo of the head movements of the reference performer, based on the performer's head motion (e.g., based on the head position representation extracted by the head position object).

In some embodiments, the tempo object executes a frequency analysis (e,g., a Fourier transform) on the head motion representation to determine a tempo (or combination of tempos) at which the performer is moving their head. The tempo object can generate a tempo representation of the reference facial capture as a combination of one or more tempos as follows, with tx representing a coefficient for each tempo:

$$t(n)=t1*\text{tempo1}(n)+t2*\text{tempo2}(n) \ldots +tN*\text{tempo}N(n).$$

In some embodiments, the tempo object analyzes the head position representation to identify specific head movements, such as head bobbing motions (e.g., vertical arcs) and head shaking motions (e.g., lateral arcs).

In some embodiments, the tempo object extracts the tempo representation based at least in part on a frequency analysis of an audio recording, such as the audio recording obtained in block 204.

In some embodiments, the reference facial capture is analyzed using the viseme object. The viseme object extracts a viseme representation of the reference facial capture. A viseme is analogous to a phoneme but captures mouth shapes associated with sounds rather than the sounds themselves.

In some embodiments, the viseme object can extract a viseme representation of facial data based on a shapes analysis of the facial data; e.g., based on the output of the face shapes object. In some embodiments, the viseme object uses predefined relationships between face shapes, sounds, and visemes to extract a viseme representation.

Figure 9:
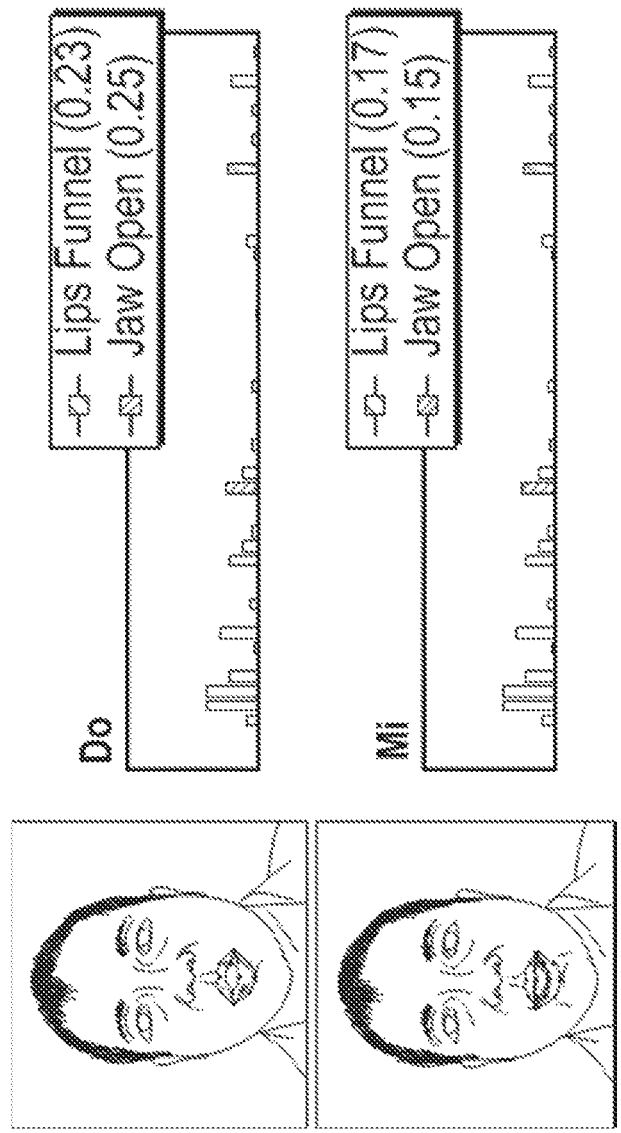
FIG. 9 depicts exemplary visemes associated with face shapes, coefficients, and sounds.

For example, FIG. 9 depicts two visemes associated with the specified face shapes and sounds (Do and Mi). For example, as shown in FIG. 9, a shapes representation of:

$$f(n)=0.23*\text{LipFunnel}+0.25*\text{JawOpen}$$

may correspond to a viseme for the sound "$\overline{\text{Do}}$." That is, when a person says "$\overline{\text{Do}}$," they typically make the face shapes represented by the above shapes representation.

A viseme representation of the reference facial capture can take the form of the following equation:

$$viz(n)=v1*viz1(n)+v2*viz2(n) \ldots +vN*vizN(n);$$

which expresses a sequence of visemes corresponding to a specific word, phrase, or sound, and vx represents a coefficient associated with each viseme.

In some embodiments, the viseme object can determine a viseme representation of the reference facial capture based at least in part on an audio recording of the reference performance (e.g., the audio recording obtained at block 204), using a pre-determined mapping of sounds to visemes.

In some embodiments, the viseme object can determine a viseme representation of the reference facial capture based at least in part on text (e.g., text obtained at block 206) that is provided to the viseme object, using a predetermined mapping of text to corresponding visemes, or using a predetermined mapping of text to sounds that are then mapped to visemes.

In some embodiments, one or more of the objects described above can determine the amplitude, frequency, timing, and/or duration associated with each of the above-described data representations. For example, in some embodiments, the face shapes object determines how long the reference performer maintains a specific expression or face shape. In some embodiments, the head position object determines how deeply or how frequently the reference performer has bobbed their head. In some embodiments, the emotion object determines how happy a reference performer appears, or for how long the reference performer appears happy. Thus, the corresponding representations of the reference facial capture may include data representing amplitude, frequency, timing, and/or duration information.

Optionally, at block 210, one or more of the representations of the reference facial capture are weighted and/or normalized. Normalizing the representations may subsequently enable more accurate comparisons of facial performances between different users. Weighting the representation may enable subsequent comparisons that weight certain aspects of the reference performance more heavily than others; e.g., that weight the importance of facial shapes more heavily than the importance of head motion when evaluating how well two facial performances match each other.

A person skilled in the art of facial capture will recognize that, in some embodiments, system calibration and training may be performed on a user prior to facial tracking, facial capture, or collection of facial data. Thus, in some embodiments, normalization includes system calibration and training prior to obtaining the facial capture. For example, the system can be calibrated and trained by capturing a user(s) performing a facial range of motion (ROM) routine that exercises the facial muscles to their extremities, thus allowing the system to calibrate the maximum extent of facial deformation and normalize facial shapes or movements among users. For example, the system may normalize users' "brows up" from 0-1. In this manner, one user's "brows up" can be compared to another user's "brows up" even though each user might have significantly differing forehead sizes. Such initial calibration and training data may be used to normalize the representations of a user's facial performance.

At block 212, a reference set of facial performance data is stored. In some embodiments, the reference set of facial performance data includes facial landmark data. In some embodiments, the reference set of facial performance data includes the shapes representation, emotion representation, head position representation, tempo representation and/or viseme representation of the facial capture.

In some embodiments, the reference set of performance data includes normalized and/or weighted versions of one or more of these representations, as described with respect to block 210.

In some embodiments, the reference set of facial performance data includes the facial capture of the reference performance (e.g., a video recording of the reference performance, or a still image of the reference performance, or a scan of the reference performance) and/or the audio capture of the reference performance (e.g., an audio recording of the reference performance).

In some embodiments, the reference set of performance data is stored in reference performance data storage, such as depicted in FIG. 1. The reference performance data storage may be a disk, server, or portable storage media, for example. In some embodiments, the stored reference set of facial performance data can be retrieved later for playback and/or comparison with a user's set of facial performance data, as described below with respect to FIG. 2.

User Performance: Capture, Analysis, and Comparison to Reference Performance

Figure 3:
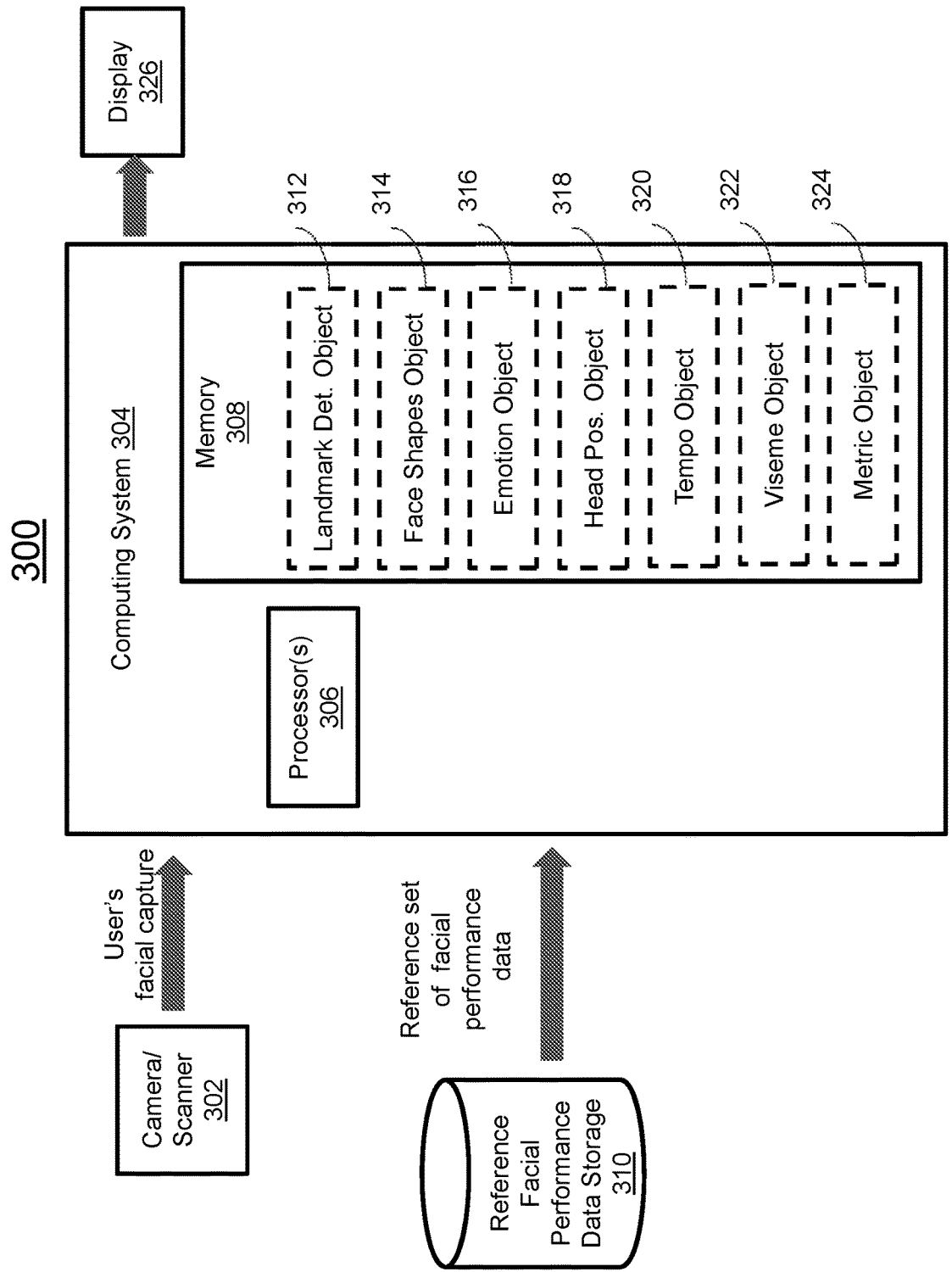
FIG. 3 depicts a block diagram of an exemplary facial capture analysis and training system.

FIG. 3 depicts exemplary facial capture analysis and training system 300 that can be used to capture and analyze a user's facial performance and compare the user's facial performance to a reference facial performance. Facial capture analysis and training system 300 can be implemented using camera/scanner 302 to obtain a user's facial capture, and computing system 304 having one or more processor(s) 306 for executing facial analysis objects in memory 308, such as landmark detection object 312, face shapes object 314, emotion object 316, head position object 318, tempo object 320, and/or a viseme object 322. Computing system 304 can execute one or more of these facial analysis objects to analyze the user's facial capture and extract a second set of facial performance data based on the user's facial capture.

In some embodiments, the objects depicted in FIG. 3 use the same approach for extracting a representation of the facial capture as the objects depicted in FIG. 1.

In some embodiments, the objects depicted in FIG. 3 use a different approach for extracting a representation of the facial capture as the objects depicted in FIG. 1. For example, face shapes object 114 in FIG. 1 may use a FACS-based analysis to extract a shapes representation, while face shapes object 314 in FIG. 3 may use another type of face shape analysis to extract a shapes representation of the facial capture.

The second set of facial performance data can be compared to a reference set of facial performance data retrieved from reference facial performance data storage 310 to generate one or more matching metrics using, e.g., metric object 324 in memory 308. The one or more matching metrics can be displayed on display 326.

While reference facial performance data storage 310 is shown as being a database that is separate from computing system 304, it should be appreciated that reference facial performance data storage 310 may instead be implemented using a single storage device that is local or remote to computing system 304.

As discussed in greater detail below, facial capture and analysis system 300 can be used to compare a user's facial performance to a reference facial performance and display an indication(s) of how well they match, thereby potentially training a user to match a reference performance or providing an objective evaluation of the quality of the match between the user's performance and the reference performance.

Figure 4:
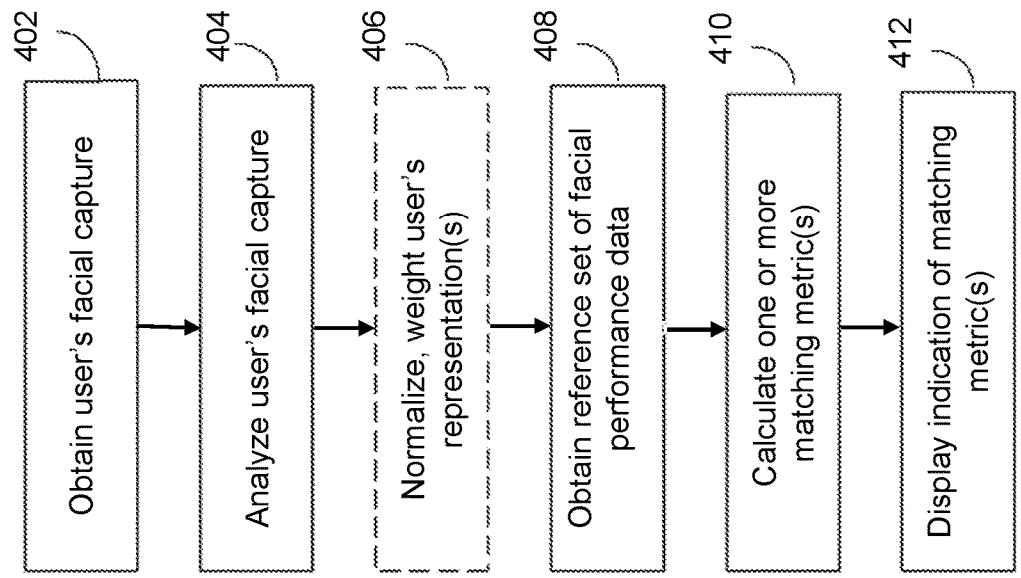
FIG. 4 illustrates an exemplary process 400 for obtaining and analyzing a user's facial capture and comparing it to a reference performance.

FIG. 4 illustrates exemplary process 400 for facial capture analysis and training.

At block 402, a user's facial capture is obtained. In some embodiments, the user's facial capture is obtained using a camera or scanner, such as a video camera or laser scanner. In some embodiments, the user's facial capture is a video recording of a user's facial performance obtained using a video camera. In some embodiments, the user's facial capture is a digital scan of the user's facial performance obtained using a laser scanner, mesh scanner, marker-based scanner, or markerless scanner. In some embodiments, the facial capture is obtained using facial sensors and/or electrodes.

At block 404, the user's facial capture is analyzed. In some embodiments, the user's facial capture is analyzed as described earlier with respect to block 208 of process 200. For example, the user's facial capture can be analyzed using a landmark detection object, a face shapes object, an emotion object, a head position object, a tempo object, and/or a viseme object to extract, e.g., landmark data, a shapes representation, an emotion representation, a head position representation, a tempo representation, and/or a viseme representation of the user's facial capture.

Optionally, at block 406, one or more of the representations of the user's facial capture can be weighted or normalized, as described earlier with respect to block 210 of process 200.

At block 408, a reference set of facial performance data is obtained, such as the reference set of facial performance data described earlier with respect to FIGS. 1 and 2. In some embodiments, the reference set of facial performance data is obtained from a disk, server, or portable storage media. While FIG. 4 depicts the reference set of facial performance data being obtained after the user's facial capture is analyzed, in some embodiments, the reference set of facial performance data is obtained before or during the obtaining of the user's facial capture at block 402, or while the user's facial capture is analyzed at block 404.

At block 410, one or more matching metrics are calculated, using, e.g., metric object 324. In some embodiments, calculating the one or more matching metrics includes correlating a reference shapes representation from the reference set of facial performance data to the user's shapes representation extracted at block 408. In some embodiments, correlating the user's shapes representation fU(n) to the reference shapes representation fR(N) includes calculating fr(n)=avgT{fU(n)−fR(n)}, where T is the time duration over which the two representations are correlated and fr(n) is a shapes metric that captures how well the two representations are correlated. That is, in some embodiments, calculating the one or more matching metrics includes computing the average difference between the user's shapes representation and the reference shapes representation over a given time duration T and outputting the result of the calculation as fr(n), where fr(n) represents an n-length sequence of numeric coefficient differences for each constituent face shape.

More generally, there are many ways to correlate a user's shapes representation with a reference shapes representation. For example, if $$fU(n)=0.23*JawOpen+0.25*LipsFunnel; and$$

$$fR(n)=0.1*JawOpen+0.6*LipsFunnel+0.5*EyeSquint,$$

fr(n) can be calculated as the difference between the corresponding coefficients, (0.23−0.1)+(0.25−0.6)+(0−0.5). In some examples, the absolute value of the differences between coefficients may be calculated when determining fr(n), as depicted below.

$$Err(n)=k1*Err\{shape1(n)\}+k2*Err\{(shape2(n)\} \ldots$$

where k=weighting coefficients and Err{(shape1(n)}=abs|fR(n)−fU(n)|

Figure 11:
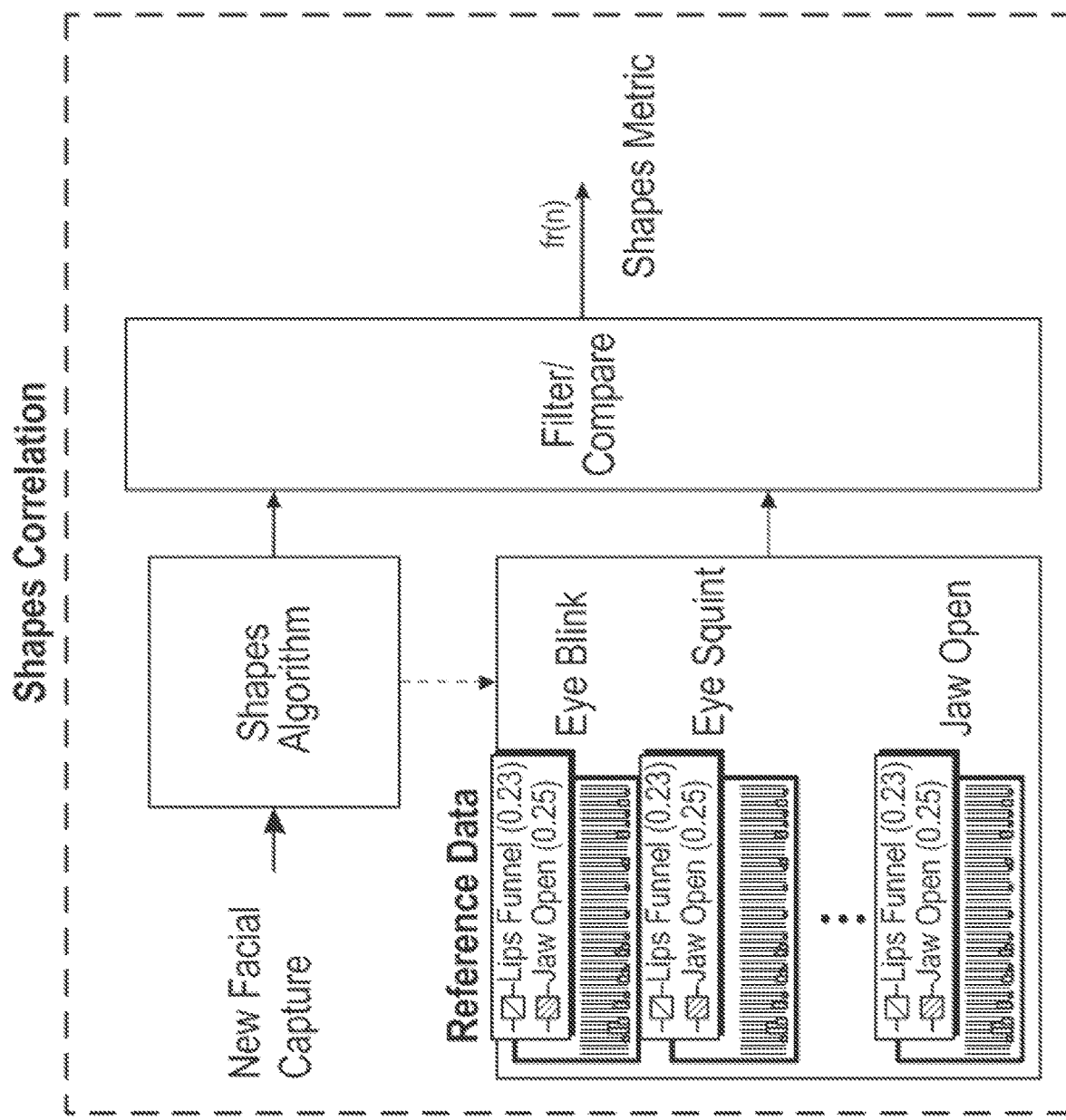
FIG. 11 depicts an exemplary conceptual block diagram for correlating shapes representations.

In this approach, each element of the shapes representation for the user is compared to the corresponding element of the shapes representation for the reference performer to determine how well the two representations match; e.g., to determine the error (Err) between the two representations, which can be used to calculate a matching metric (or can be used as a matching metric itself). As mentioned below, a similar error-based approach can be used for comparing the other representations and calculating additional matching metrics. FIG. 11 depicts an exemplary approach for calculating a shapes metric.

Figure 12:
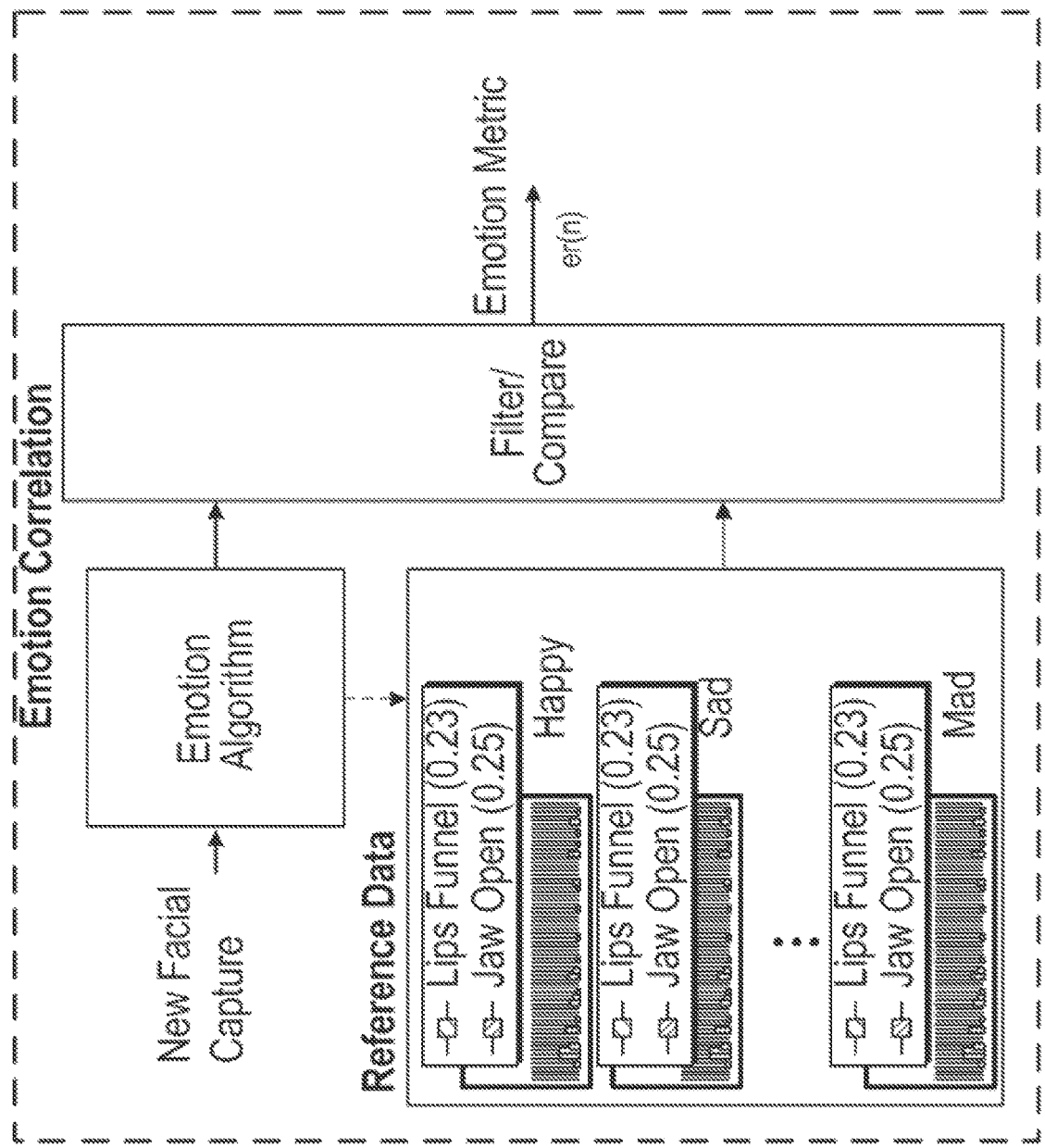
FIG. 12 depicts an exemplary conceptual block diagram for correlating emotion representations.

Similarly, in some embodiments, calculating the one or more matching metrics includes correlating the reference emotion representation to the user's emotion representation. In some embodiments, correlating the reference emotion representation eR(N) to the user's emotion representation eU(n) includes calculating er(n)=avgT{eU(n)−eR(n)}, where T is the time duration over which the representation is averaged and er(n) is an emotion metric that captures how well the two representations are correlated. FIG. 12 depicts an exemplary approach for calculating an emotion metric.

In some embodiments, calculating the one or more matching metrics includes correlating the reference head position representation with the user's head position representation in a manner similar to that described above.

Figure 13:
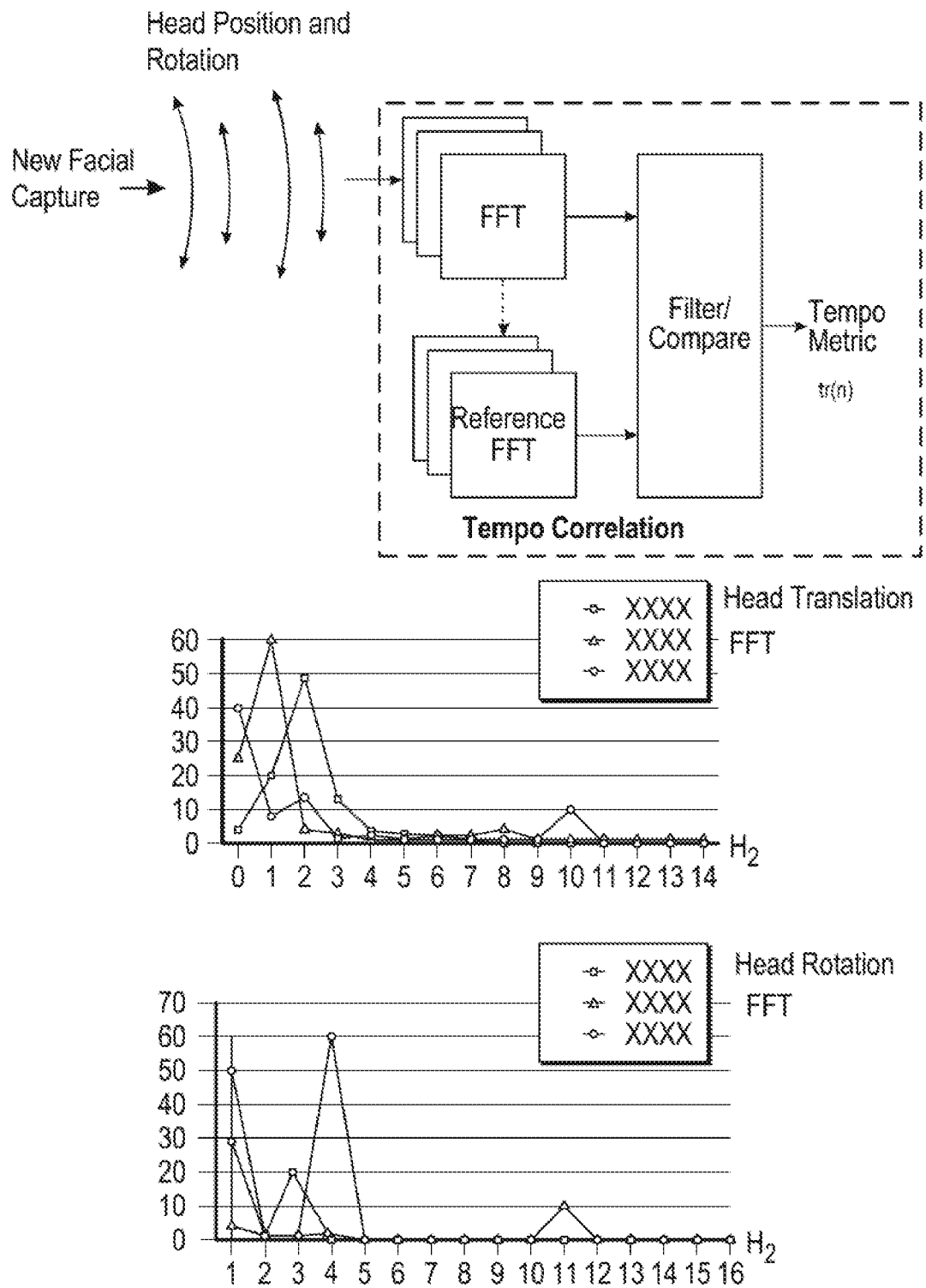
FIG. 13 depicts an exemplary conceptual block diagram for correlating tempo representations based on analysis of head position representations.

In some embodiments, calculating the one or more matching metrics includes correlating the reference tempo representation to the user's tempo representation to generate a tempo metric tr(n), in a manner similar to that described above. FIG. 13 depicts an exemplary approach for calculating a tempo metric.

Figure 14:
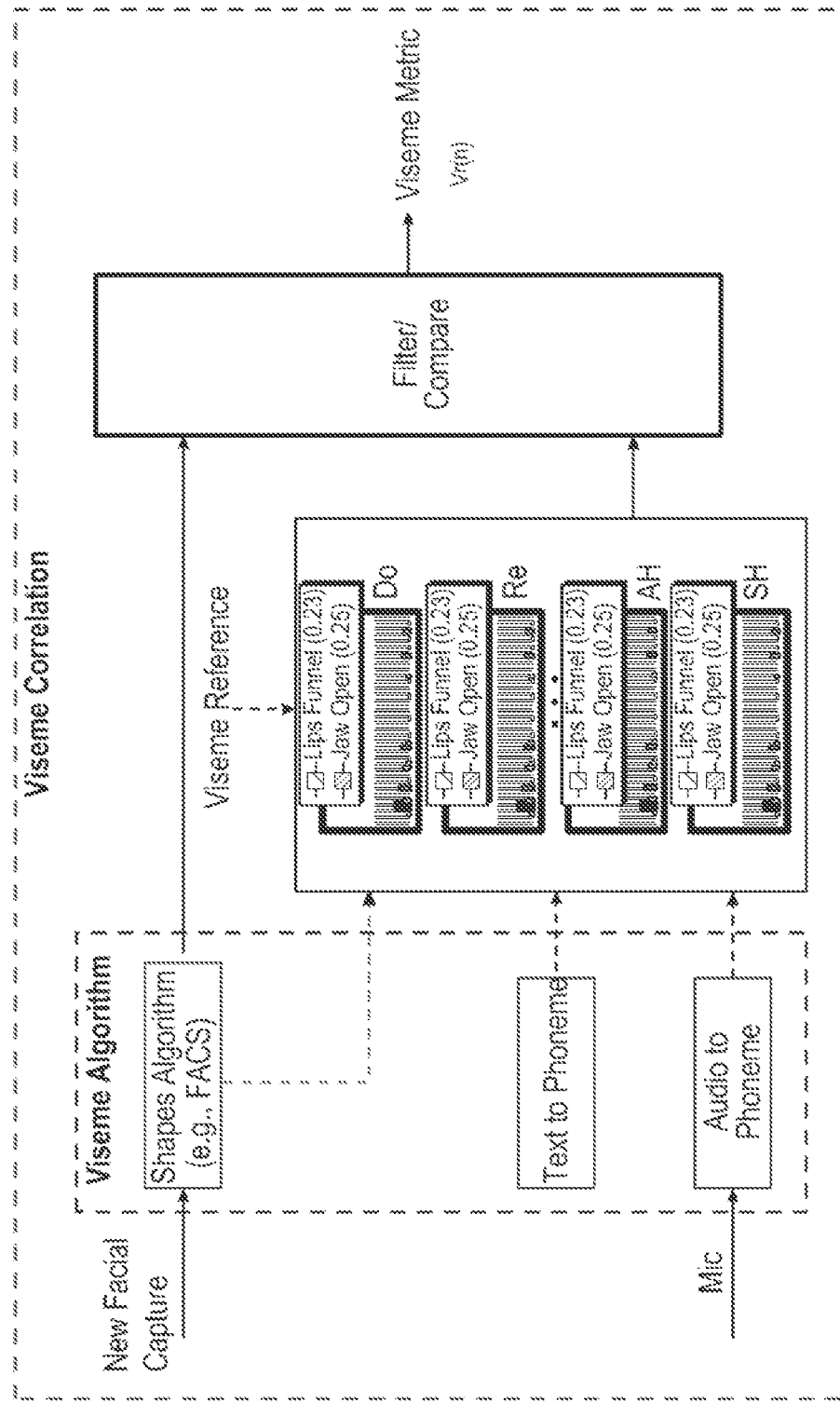
FIG. 14 depicts an exemplary conceptual block diagram for correlating viseme representations.

In some embodiments, calculating the one or more matching metrics includes correlating the reference viseme representation to the user's viseme representation to generate a viseme metric vr(n). FIG. 14 depicts an exemplary approach for calculating a viseme metric.

In some embodiments, calculating the one or more matching metrics includes correlating the user's representation(s) to the reference representation(s) either instantaneously (i.e., correlating the two representations at a specific point in time) or as an average over a time period. For example, the one or more matching metrics can reflect how well the user's face shapes match the reference face shapes (based on the correlation of their respective shapes representations) at a single point in time during the user's performance or reference performance, or can determine how well the user's and reference performer's face shapes matched, on average, over a longer time duration, such as over the full duration of the reference facial performance or over a running ten-second average, for example.

As discussed above, in some embodiments, a separate matching metric can be calculated based on the correlation of each of the types of representations. For example, a shapes metric fr(n) can be calculated based on the correlation between the user's shape representation and the reference shapes representation; an emotion metric er(n) can be calculated based on the correlation between the user's emotion representation and the reference emotion representation, a viseme metric vr(n) can be calculated based on the correlation between the user's viseme representation and the reference viseme representation, and so on.

In some embodiments, calculating the one or more metrics includes calculating an overall matching metric based on the correlations between two or more types of representations. For example, the overall matching metric can be calculated based on the correlation between the user's shapes representation and the reference shapes representation, and on the correlation between the user's emotion representation and the reference emotion representation, and so on.

In some embodiments, calculating the one or more matching metrics includes calculating a final performance metric P(n) by calculating a weighted sum of each of the matching metrics over the duration of the reference facial performance or user facial performance, such as:

$$P(n)=Pf1*fr(n)+Pf2*er(n)+Pf3*tr(n)+PfN*vizr(n);$$

where Pf is a weighting factor for each metric.

In some embodiments, calculating the one or more matching metrics includes weighting certain metrics more heavily than others, or weighting certain portions of a correlation more heavily than other portions of the same correlation. For example, calculating a shapes metric based on the correlation of the user's shapes representation to the reference shapes representation may include weighting the result of the correlations between certain facial shapes more heavily than the result of the correlations between other facial shapes. Depending on the purpose for which facial capture, analysis, and training system is used, certain facial shapes or facial movements may be more important for evaluating a match than other facial shapes or movements. For example, if a user is using system 300 for the purpose of learning to speak a foreign language or lip-synching, matching the lip and tongue movements of the reference performance may be more important than matching the eye movements, and the one or more matching metrics may be calculated in a manner that reflects their relative importance (e.g., by weighting the correlation of the lip and tongue movements more heavily than the correlation of the eye movements). On the other hand, if the person is using the system to reproduce a theatrical performance, matching the eye movements or other facial movements may be of similar importance to matching the lip and tongue movements.

Similarly, in some examples, calculating an overall matching metric based on the correlations of multiple types of representations may include weighting the correlations differently depending on how important each correlation is to the matching metric(s). For example, in some scenarios, the correlation of the shapes representations may be more important than the correlation of the head position representations in determining how well a user's performance matches the reference performance, and therefore the correlation of the shapes representation may be weighted more heavily than the correlation of the head position representations when calculating the overall matching metric.

In some embodiments, calculating the one or more matching metrics includes calculating a time difference between one or more of the user's representations to the analogous reference representations to determine whether the user's facial performance leads or lags the reference facial performance.

A person of skill in the art will appreciate that there are many ways to calculate one or more matching metrics based on the correlation of one or more representations of the reference facial capture and user's facial capture.

Returning to FIG. 4, at block 412, an indication(s) of the one or more matching metrics is displayed. In some embodiments, the indication(s) of the one or more matching metrics is a graphical element that indicates the current or cumulative value of the one or more matching metrics. The graphical element may be a needle that swings back and forth depending on the value of the matching metric, for example. The graphical element may be a colored shape that changes its color based on the value of the matching metric, for example.

In some embodiments, the indication(s) of the value of the matching metric(s) is a number or score, a word (e.g., "Good," "Poor," etc.), or some other alphanumeric indication of the current or cumulative value of the one or more matching metric(s).

Figure 15:
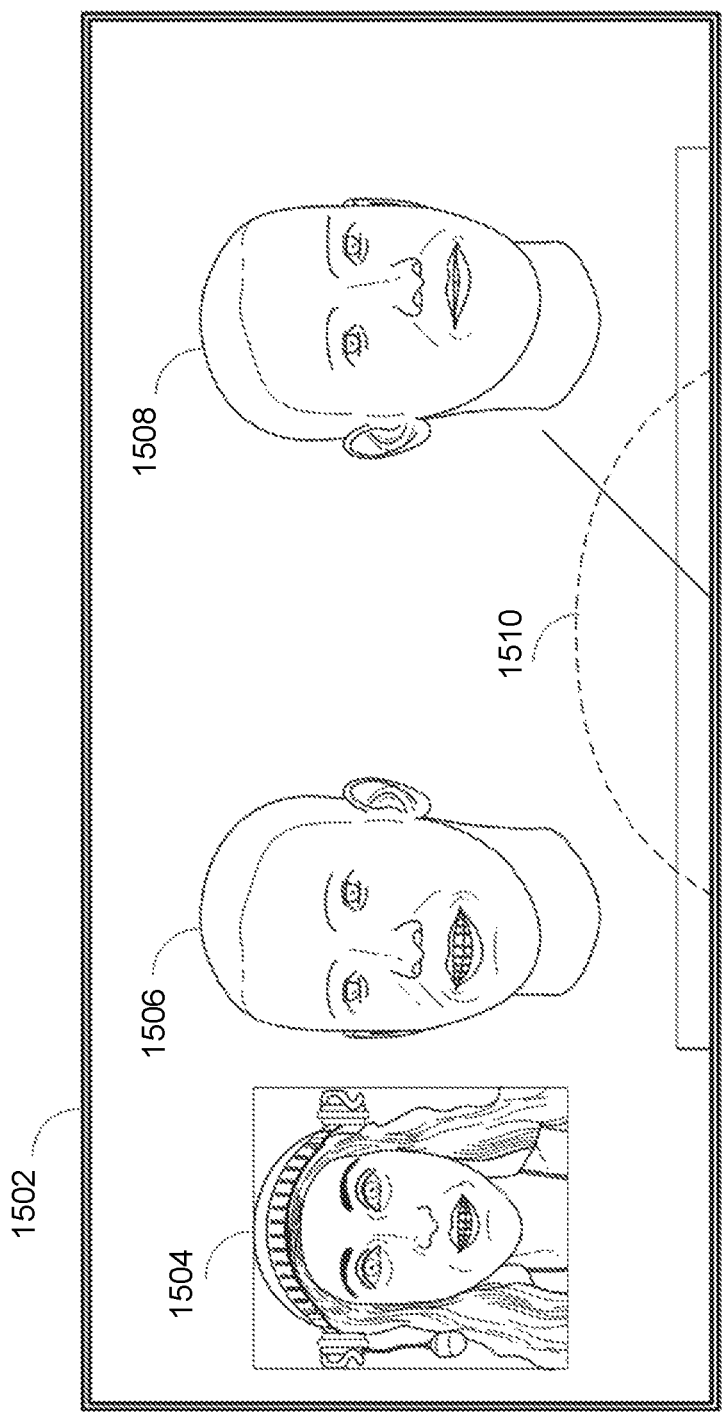
FIG. 15 depicts an exemplary user interface for a facial capture analysis and training system.

FIG. 15 depicts an exemplary user interface 1502 that can be used for facial capture analysis and training. User interface 1502 includes a video display of the reference facial performance 1504, a reference avatar 1506 representing the reference facial performance (e.g., an avatar generated based on the reference facial capture, landmark data, and/or reference set of facial performance data), and a user avatar 1508 representing a user's facial performance (e.g., an avatar generated based on the user's facial capture, the user's landmark data, and/or the user's set of facial performance data).

User interface 1502 includes graphical element 1510 that provides an indication of the current value of a matching metric; e.g., an indication of how well the user's facial performance is matching the reference facial performance at a given point in time. In exemplary user interface 1502, graphical element 1510 is a needle that swings between reference avatar 1506 and user avatar 1508 depending on the value of the matching metric.

User interface 1502 may be used for training a user to match a reference facial performance, for example, or for allowing an audience to view how well a user's facial performance is matching a reference facial performance (such as in a lip-synching competition, for example).

In some embodiments, a facial capture analysis and training system can provide an indication of how well a user's facial performance is matching a reference facial performance in real-time, while the user is performing. For example, in user interface 1502, user avatar 1508 and graphical element 1510 can be generated and displayed in real-time, while the user is performing.

In some embodiments, a facial capture analysis and training system, such as system 300, can provide the user or an audience with real-time feedback on how well the user is matching the reference performance. Such immediate feedback can be useful for, e.g., a user who is learning a foreign language and is trying to reproduce a particular sound or word. In this case, system 300 and user interface 1502 can provide feedback to the user on whether they are getting closer to the reference facial movement or mouth shape associated with the sound or word, thereby helping to train the user. In some cases, such feedback can help a user iteratively improve their facial performance by providing quantitative feedback on each attempt, potentially in real time.

In the user interface depicted in FIG. 15, graphical element 1502 provides an indication of the current value of a matching metric. In other embodiments, graphical element 1502 or another displayed element can provide an indication of the overall (cumulative) match quality of the performance at the end of the performance, such as a single, overall score (or multiple overall scores) based on intermediate matching metric values generated at multiple times during the performance. The overall score(s) may be useful for providing an unbiased, quantitative assessment of the overall matching quality of a lip-synching performance, for example.

In some embodiments, a facial capture analysis and training system (e.g., system 300) can play back an audio recording associated with the reference facial performance while displaying user interface 1502, thereby allowing a user or an audience to hear the audible component of the reference performance while the user is attempting to replicate the reference performance.

While the discussion above focuses on comparing a dynamic reference facial performance (e.g., a reference performer who is singing or speaking) to a dynamic user's facial performance, in some examples, the reference facial capture is a still image of a person's face, without any facial movements. In this case, the facial capture analysis and training system can provide feedback to a user on how well the user is matching the facial expression of the reference image; i.e., whether they are getting closer to matching the image as they perform facial movements. This variation may be useful for training stroke victims to activate certain facial muscles by attempting to emulate a reference facial expression, for example, or for helping users to learn a foreign language by attempting to make a sound by emulating a specific mouth shape.

While the discussion above focuses on comparing facial captures of two different users, in some cases, the reference performer and the user may be the same person; that is, a user may try to reproduce their own reference facial performance.

Figure 16:
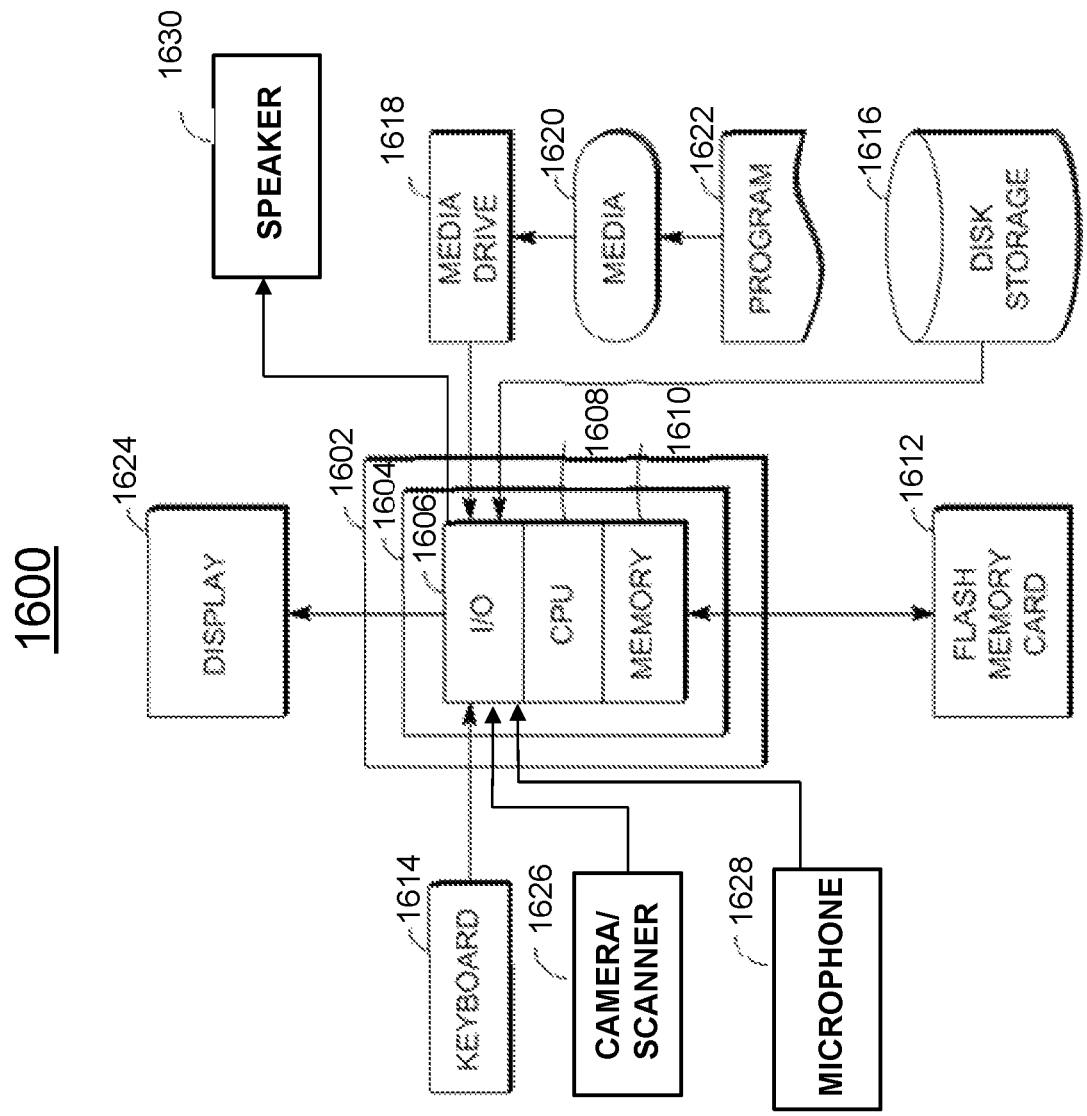
FIG. 16 depicts an exemplary facial capture analysis and training system.

Turning now to FIG. 16, components of an exemplary computing system 1600, configured to perform any of the above-described processes and/or operations are depicted. For example, computing system 1600 may be used to implement computing systems 102 and/or 302 and to perform processes 200 and/or 400. Computing system 1600 may include, for example, a processor, memory, storage, and input/output peripherals (e.g., display, keyboard, stylus, drawing device, disk drive, Internet connection, camera/scanner, microphone, speaker, etc.). However, computing system 1600 may include circuitry or other specialized hardware for carrying out some or all aspects of the processes.

In computing system 1600, the main system 1602 may include a motherboard 1604 with a bus that connects an input/output (I/O) section 1606, one or more microprocessors 1608, and a memory section 1610, which may have a flash memory card 1612 related to it. Memory section 1610 may contain computer-executable instructions and/or data for carrying out process 200 and/or process 400. The I/O section 1606 may be connected to display 1624 (e.g., to display user interface 1502), a keyboard 1614 (e.g., to provide text to the viseme object), a camera/scanner 1626 (e.g., to obtain a facial capture), a microphone 1628 (e.g., to obtain an audio recording), a speaker 1630 (e.g., to play back the audio recording), a disk storage unit 1616, and a media drive unit 1618. The media drive unit 1618 can read/write a non-transitory computer-readable storage medium 1620, which can contain programs 1622 and/or data used to implement process 200 and/or process 400.

Additionally, a non-transitory computer-readable storage medium can be used to store (e.g., tangibly embody) one or more computer programs for performing any one of the above-described processes by means of a computer. The computer program may be written, for example, in a general-purpose programming language (e.g., Pascal, C, C++, Java, or the like) or some specialized application-specific language.

Various exemplary embodiments are described herein. Reference is made to these examples in a non-limiting sense. They are provided to illustrate more broadly applicable aspects of the disclosed technology. Various changes can be made and equivalents can be substituted without departing from the true spirit and scope of the various embodiments. In addition, many modifications can be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which can be readily separated from or combined with the features of any of the other several embodiments without departing from the scope or spirit of the various embodiments.

We claim:

1. A method for evaluating a facial performance using facial capture of two users, the method comprising:
   obtaining a reference set of facial performance data representing a first user's facial capture;
   obtaining a facial capture of a second user;
   extracting a second set of facial performance data based on the second user's facial capture;
   calculating at least one matching metric based on a comparison of the reference set of facial performance data to the second set of facial performance data, wherein calculating the at least one matching metric based on the comparison of the reference set of facial performance data to the second set of facial performance data includes:
      while capturing the second user's performance:
         calculating a first value of the at least one matching metric at a first time; and
         calculating a second value of the at least one matching metric at a second time different from the first time; and
   displaying an indication of the at least one matching metric on a display, wherein displaying the indication of the at least one matching metric on the display includes:
      while capturing the second user's performance:
         displaying, on the display, an indication of the first value of the at least one matching metric; and
         after displaying the indication of the first value of the at least one matching metric, displaying, on the display, an indication of the second value of the at least one matching metric.

2. The method according to claim 1,
wherein the reference set of facial performance data includes a reference shapes representation of the first user's facial performance,
wherein extracting the second set of facial performance data comprises extracting a second shapes representation of the second user's facial performance, and
wherein calculating the at least one matching metric includes calculating a correlation between the reference shapes representation and the second shapes representation.

3. The method according to claim 2, wherein the reference shapes representation includes a reference set of weighted facial shapes, and wherein the second shapes representation includes a second set of weighted facial shapes.

4. The method according to claim 3, wherein calculating the at least one matching metric includes calculating a correlation between a respective weighted facial shape of the reference set of weighted facial shapes and the corresponding weighted facial shape of the second set of weighted facial shapes.

5. The method according to claim 2, wherein extracting the second shapes representation comprises computing a FACS (Facial Action Coding System) analysis of the second user's facial performance.

6. The method according to claim 2,
wherein the reference set of facial performance data includes a reference emotion representation of the first user's facial performance,
wherein extracting the second set of facial performance data includes computing a second emotion representation of the second user's facial performance, and
wherein calculating the at least one matching metric includes calculating a correlation between the reference emotion representation and the second emotion representation.

7. The method according to claim 6, wherein the second emotion representation is computed based on the second shapes representation.

8. The method according to claim 1,
wherein the reference set of facial performance data includes a reference head position representation of the first user's facial performance,
wherein extracting the second set of facial performance data includes computing a second head position representation of the second user's facial performance, and
wherein calculating the at least one matching metric includes calculating a correlation between the reference head position representation and the second head position representation.

9. The method according to claim 8,
wherein the reference set of facial performance data includes a reference tempo representation of the first user's facial performance,
wherein extracting the second set of facial performance data includes computing a second tempo representation of the second user's facial performance, and
wherein calculating the at least one matching metric includes calculating a correlation between the reference tempo representation and the second tempo representation.

10. The method according to claim 9, wherein the second tempo representation is computed based on a frequency analysis of the second head position representation.

11. The method according to claim 9, further comprising:
obtaining audio data associated with the first user's facial performance; and
computing a frequency analysis of the audio data to determine an audio tempo,
wherein calculating the at least one matching metric comprises comparing the second tempo representation to the audio tempo.

12. The method according to claim 1,
wherein the reference set of facial performance data includes a reference viseme representation of the first user's facial performance,
wherein extracting the second set of facial performance data includes computing a second viseme representation of the second user's facial performance, and
wherein calculating the at least one matching metric includes calculating a correlation between the reference viseme representation and the second viseme representation.

13. The method according to claim 12, wherein the second viseme representation is computed at least in part based on the second shapes representation.

14. The method according to claim 12, further comprising:
obtaining text associated with the first user's facial performance,
wherein the second viseme representation is computed at least in part based on the text.

15. The method according to claim 14, wherein the text comprises song lyrics.

16. The method according to claim 1, wherein the reference set of facial performance data comprises data representing a video of the first user's facial performance.

17. The method according to claim 1, wherein obtaining the second facial capture comprises taking a video of the second user's facial performance.

18. The method according to claim 1, wherein the reference set of facial performance data includes data representing a still image of the first user's performance.

19. The method according to claim 1, further comprising:
displaying, on the display, a video of the first user's performance.

20. The method according to claim 1, further comprising:
displaying, on the display, a reference avatar based on the reference set of facial performance data.

21. The method according to claim 1, wherein the reference set of facial performance data and the second set of facial performance data are normalized prior to calculating the one or more matching metrics.

22. A non-transitory computer-readable storage medium storing one or more programs, the one or more programs comprising instructions, which when executed by one or more processors in a system with a camera/scanner, including a camera and/or a scanner, and a display cause the one or more processors to:
obtain a reference set of facial performance data representing a first facial capture of a first user's performance;
obtain, from the camera/scanner, a second facial capture of the second user's performance;
extract a second set of facial performance data based on the second facial capture;
calculate at least one matching metric based on a comparison of the reference set of facial performance data to the second set of facial performance data, wherein calculating the at least one matching metric based on the comparison of the reference set of facial performance data to the second set of facial performance data includes:

while capturing the second user's performance:
calculating a first value of the at least one matching metric at a first time; and
calculating a second value of the at least one matching metric at a second time different from the first time; and
enable display, on the display, of an indication of the at least one matching metric, wherein displaying the indication of the at least one matching metric on the display includes:
while capturing the second user's performance:
displaying, on the display, an indication of the first value of the at least one matching metric; and
after displaying the indication of the first value of the at least one matching metric, displaying, on the display, an indication of the second value of the at least one matching metric.

23. The non-transitory computer-readable storage medium according to claim 22,
wherein the reference set of facial performance data includes a reference shapes representation of the first user's facial performance,
wherein extracting the second set of facial performance data comprises extracting a second shapes representation of the second user's facial performance, and
wherein calculating the at least one matching metric includes calculating a correlation between the reference shapes representation and the second shapes representation.

24. The non-transitory computer-readable storage medium according to claim 23, wherein the reference shapes representation includes a reference set of weighted facial shapes, and wherein the second shapes representation includes a second set of weighted facial shapes.

25. The non-transitory computer-readable storage medium according to claim 24, wherein calculating the at least one matching metric includes calculating a correlation between a respective weighted facial shape of the reference set of weighted facial shapes and the corresponding weighted facial shape of the second set of weighted facial shapes.

26. The non-transitory computer-readable storage medium according to claim 23, wherein extracting the second shapes representation comprises computing a FACS (Facial Action Coding System) analysis of the second user's facial performance.

27. The non-transitory computer-readable storage medium according to claim 23,
wherein the reference set of facial performance data includes a reference emotion representation of the first user's facial performance,
wherein extracting the second set of facial performance data includes computing a second emotion representation of the second user's facial performance, and
wherein calculating the at least one matching metric includes calculating a correlation between the reference emotion representation and the second emotion representation.

28. The non-transitory computer-readable storage medium according to claim 27, wherein the second emotion representation is computed based on the second shapes representation.

29. The non-transitory computer-readable storage medium according to claim 22,
wherein the reference set of facial performance data includes a reference head position representation of the first user's facial performance,
wherein extracting the second set of facial performance data includes computing a second head position representation of the second user's facial performance, and
wherein calculating the at least one matching metric includes calculating a correlation between the reference head position representation and the second head position representation.

30. The non-transitory computer-readable storage medium according to claim 29,
wherein the reference set of facial performance data includes a reference tempo representation of the first user's facial performance,
wherein extracting the second set of facial performance data includes computing a second tempo representation of the second user's facial performance, and
wherein calculating the at least one matching metric includes calculating a correlation between the reference tempo representation and the second tempo representation.

31. The non-transitory computer-readable storage medium according to claim 30, wherein the second tempo representation is computed based on a frequency analysis of the second head position representation.

32. The non-transitory computer-readable storage medium according to claim 31, the one or more programs further comprising instructions, which when executed by the one or more processors cause the one or more processors to:
obtain audio data associated with the first user's facial performance; and
compute a frequency analysis of the audio data to determine an audio tempo,
wherein calculating the at least one matching metric comprises comparing the second tempo representation to the audio tempo.

33. The non-transitory computer-readable storage medium according to claim 22,
wherein the reference set of facial performance data includes a reference viseme representation of the first user's facial performance,
wherein extracting the second set of facial performance data includes computing a second viseme representation of the second user's facial performance, and
wherein calculating the at least one matching metric includes calculating a correlation between the reference viseme representation and the second viseme representation.

34. The non-transitory computer-readable storage medium according to claim 33, wherein the second viseme representation is computed at least in part based on the second shapes representation.

35. The non-transitory computer-readable storage medium according to claim 33, the one or more programs further comprising instructions, which when executed by the one or more processors cause the one or more processors to:
obtain text associated with the first user's facial performance,
wherein the second viseme representation is computed at least in part based on the text.

36. The non-transitory computer-readable storage medium according to claim 35, wherein the text comprises song lyrics.

37. The non-transitory computer-readable storage medium according to claim 22, wherein the reference set of facial performance data comprises data representing a video of the first user's facial performance.

38. The non-transitory computer-readable storage medium according to claim 22, wherein obtaining the second facial capture comprises taking a video of the second user's facial performance.

39. The non-transitory computer-readable storage medium according to claim 22, wherein the reference set of facial performance data includes data representing a still image of the first user's performance.

40. The non-transitory computer-readable storage medium according to claim 22, the one or more programs further comprising instructions, which when executed by the one or more processors cause the one or more processors to:
display, on the display, a video of the first user's performance.

41. The non-transitory computer-readable storage medium according to claim 22, the one or more programs further comprising instructions, which when executed by the one or more processors cause the one or more processors to:
display, on the display, a reference avatar based on the reference set of facial performance data.

42. The non-transitory computer-readable storage medium according to claim 22, wherein the reference set of facial performance data and the second set of facial performance data are normalized prior to calculating the one or more matching metrics.

43. A system for evaluating a facial performance using facial capture of two users, the system comprising:
a display;
a camera/scanner, including a camera and/or a scanner;
one or more processors;
a memory;
one or more programs, wherein the one or more programs are stored in the memory and configured to be executed by the one or more processors, the one or more programs including instructions for:
obtaining a reference set of facial performance data representing a first facial capture of a first user's performance;
obtaining, from the camera/scanner, a second facial capture of a second user's performance;
extracting a second set of facial performance data based on the second facial capture;
calculating at least one matching metric based on a comparison of the reference set of facial performance data to the second set of facial performance data, wherein calculating the at least one matching metric based on the comparison of the reference set of facial performance data to the second set of facial performance data includes:
while capturing the second user's performance:
calculating a first value of the at least one matching metric at a first time; and
calculating a second value of the at least one matching metric at a second time different from the first time; and
enabling display, on the display, of the at least one matching metric on the display, wherein displaying the indication of the at least one matching metric on the display includes:
while capturing the second user's performance:
displaying, on the display, an indication of the first value of the at least one matching metric; and
after displaying the indication of the first value of the at least one matching metric, displaying, on the display, an indication of the second value of the at least one matching metric.

* * * * *